United States Patent [19]

Sekine

[11] Patent Number: 4,644,358
[45] Date of Patent: Feb. 17, 1987

[54] STEM ORIENTATION MEASUREMENT APPARATUS

[75] Inventor: Chogo Sekine, Mitaka, Japan

[73] Assignee: Nihon Musen Kabushiki Kaisha, Tokyo, Japan

[21] Appl. No.: 507,017

[22] Filed: Jun. 23, 1983

[30] Foreign Application Priority Data

Nov. 13, 1982 [JP] Japan .................................. 57-199534
Nov. 13, 1982 [JP] Japan .................................. 57-199535
Nov. 13, 1982 [JP] Japan .................................. 57-199536

[51] Int. Cl.$^4$ .......................... H04B 7/19; G01S 1/30; G01S 5/04
[52] U.S. Cl. ................................. 342/356; 342/357; 342/405; 342/434
[58] Field of Search ............................. 348/355–357, 348/405, 418, 428, 433, 434, 449, 458; 343/352

[56] References Cited

U.S. PATENT DOCUMENTS 3,144,646  8/1964  Breithaupt ........................ 343/405
3,149,334  9/1964  Cleaver et al. ................... 343/423
3,916,410 10/1975  Elwood ............................ 343/458
4,257,047  3/1981  Lipsky ............................ 343/434
4,384,293  5/1983  Deem et al. ...................... 343/252
4,445,118  4/1984  Taylor et al. .................... 343/356

Primary Examiner—Theodore M. Blum
Assistant Examiner—Gregory C. Issing
Attorney, Agent, or Firm—Burns, Doane, Swecker & Mathis

[57] ABSTRACT

An apparatus to confirm an orientation of the stem of ship by making use of a satellite included in the Global Positioning System. Radio wave signals from the satellite are received by a directional or omnidirectional antenna and the phase difference between a rotating period of said antenna and either the period of distance fluctuation, Doppler fluctuation, phase fluctuation or amplitude fluctuation is detected to obtain an orientation of the satellite which is used to obtain an accurate orientation of the stem relative to a reference direction such as due North.

8 Claims, 10 Drawing Figures

STEM ORIENTATION MEASUREMENT APPARATUS

BACKGROUND OF THE INVENTION

The present invention relates to an apparatus for measuring orientations of the stem or bow of a vehicle and more particularly to an apparatus for measuring orientations of stem of ship at sea by making use of radio waves transmitted from the Global Positioning System (as referred to GPS radio waves hereafter).

It is necessary to confirm an accurate position of ship at sea in order to sail with safety and ensure that the course of the ship will be fixed for future sailing. Generally, various navigation measurement apparatus is provided on ships to perform the above purpose. Magnetic compasses and Gyro compasses are the most popular measurement apparatus for sailing, both of which belong to measurement devices for navigation by dead reckoning.

An ordinary magnetic compass is based on a principal in which a magnetic needle mounted for free rotational movement indicates the magnetic poles of the earth. However, orientation of the magnetic poles of the earth is relatively offset from the exact north-south direction thereof so that the needle of magnetic compass does not always indicate the accurate north-sourth line. Furthermore, the indication of a magnetic needle sometimes deviates from the accurate north-south direction where a body of a ship or load thereon are made of materials which are susceptible to magnetic force. Thus, the deviation mentioned above necessarily requires a correction for accurate course thereof based on extensive experiences.

On the one hand, a gyro compass is based on a principal in which rotating action of the earth will affect a top rotating at high speed thereby indicating the orientation of axis of the earth. However, there are disadvantages to a gyro compass in that it is necessary to have a periodical maintenance and the life expectancy is not high since the device includes a mass rotating at high speed therein. Furthermore, it is not practical for ships, which are sailing in a pole region, to use either a magnet compass or gyro compass because of the regional characteristics thereof. In addition, a navigation measurement apparatus that makes use of inertia has the disadvantage of being very expensive to install on a ship.

On the other hand, there are some disadvantages where a stem orientation of a ship is determined by the use of artificial satellites. For example, radio waves transmitted from a static satellite can not generally reach a ship which is at sea in the pole region. Also, it is difficult to obtain a stem orientation of a ship which is sailing along the equator by using radio waves from static satellites since they are generally at a zenith so that the horizontal component thereof is too small to calculate the orientation thereof.

Further, it is not preferable to make use of mobile satellites for measurement of the stem orientation of a ship since they do not always belong to the same satellite system and each of them are not always within a proper angle of elevation.

SUMMARY OF THE INVENTION

It is a principal object of the present invention to provide a stem orientation measurement apparatus which is highly precise in measurement, superior in life expectancy, efficient thereof to use even in the pole regions and facile to handle.

It is another object of the present invention to provide a stem orientation measurement apparatus in which a rotating directional antenna or an omnidirectional antenna having a directivity that rotates, receives a signal transmitted from one of plural transferring satellites rotating along a predetermined orbit in the GLOBAL POSITIONING SYSTEM/NAVIGATION SYSTEM WITH TIME AND RANGES, which is in a suitable elevation for orientation measurement. A phase difference is detected between either a period of fluctuation of distance, the Doppler fluctuation or phase fluctuation and a period of rotation of the antenna or a period of exchange thereof in order to detect in advance the orientation of a satellite over the stem orientation. An accurate stem orientation is obtained from the orientation of a selected satellite and the orientation of said satellite is calculated by way of a signal from the satellite.

It is a further object of the present invention to provide a stem orientation measurement apparatus including an antenna for receiving GPS radio waves, means for effectively rotating said antenna, a GPS receiver for obtaining a location of a ship itself and an orientation of a GPS satellite, means for extracting the amount of fluctuation of received radio waves from said GPS satellite based on a PN code of said GPS satellite transmitted from said GPS receiver. Means for determining timing of said PN code and GPS signals received by said antenna, means for detecting said orientation of the GPS satellite over an orientation of the stem by way of detecting phase differences between a period of fluctuation quantity of said received radio wave or a period of rotation of said rotating antenna, means for obtaining said orientation of the stem from said orientation of the GPS satellite over said orientation of the stem and said orientation of the GPS satellite obtained by said GPS receiver, and an indicator for indicating said orientation of the stem are further included.

It is still a further object of the present invention to provide a stem orientation measurement apparatus including means for extracting the Doppler fluctuation of received radio waves from the given GPS satellite to the antenna as a means for extracting a quantity of fluctuation of received radio waves from the given GPS satellite.

It is another object of the present invention to provide a stem orientation measurement apparatus including means for extracting fluctuations of distance of received radio waves from the given GPS satellite to the antenna as a means for extracting a quantity of fluctuation of received radio waves from the given GPS satellite.

It is a further object of the present invention to provide a stem orientation measurement apparatus including means for extracting phase fluctuations of received radio waves from the given GPS satellite to the antenna as a means for extracting a quantity of fluctuation of received radio waves from the given GPS satellite.

It is still a further object of the present invention to provide a stem orientation measurement apparatus including means for extracting amplitude fluctuation of received radio waves from the given GPS satellite to the antenna as a means for extracting a quantity of fluctuation of received radio waves from the given GPS satellite.

BRIEF DESCRIPTION OF THE DRAWINGS

The drawings illustrate preferred, nonlimiting embodiments of the present invention wherein like reference numbers refer to like parts and wherein.

DETAILED DESCRIPTION OF THE INVENTION

Figure 1:
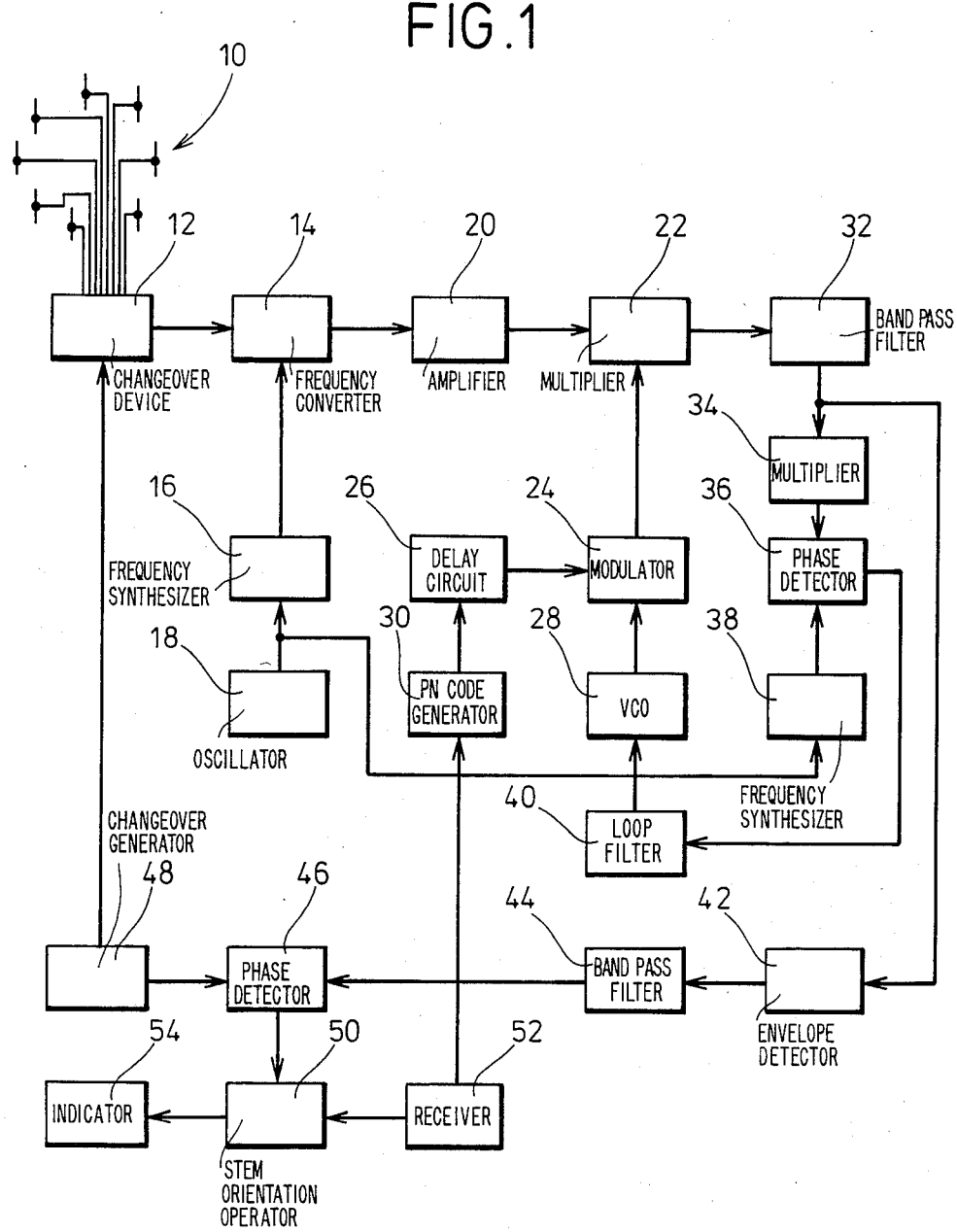
FIG. 1 is a block diagram illustrating a mechanism for a stem orientation measurement apparatus.

In FIG. 1, reference numeral 10 indicates a dipole antenna comprising eight (8) poles arranged on a circle, which is electrically connected with an antenna changeover device 12. That is, output terminals of dipole antenna 10 are connected with antenna changeover device 12. Output terminals of changeover device 12 are connected with one side of input terminals of a frequency converter 14 while the other side of input terminals thereof are connected with output terminals of a first frequency synthesizer 16. Input terminals of first frequency synthesizer 16 are connected with output terminals of a high stabilizing oscillator 18. Output terminals of the frequency converter 14 are connected with input terminals of an intermediate frequency amplifier 20 while output terminals of amplifier 20 are connected with one side of input terminals of a multiplier 22. The other side of input terminals thereof are connected with output terminals of a modulator 24. Modulator 24 includes two sets of input terminals one of which is connected with a delaying circuit 26 while the other of which is connected with output terminals of a voltage controlled oscillator 28. Input terminals of delaying circuit 26 are connected with output terminals of a PN code generator 30 (i.e. a Psuedo Noise code generator). Output terminals of multiplier 22 are connected with input terminals of a first band pass filter 32 while output terminals of band pass filter 32 are connected with input terminals of a frequency multiplier 34. On the one hand, a phase detector 36 accepts output from frequency multiplier 34 as well as output from a second frequency synthesizer 38. Thus, one pair of input terminals of phase detector 36 are connected with output terminals of frequency multiplier 34 while the other pair of input terminals thereof are connected with output terminals of frequency synthesizer 38. In this case, input terminals of frequency synthesizer 38 are connected with output terminals diverging from high stabilizing oscillator 18. Output terminals of phase detector 36 are connected with input terminals of voltage controlled oscillator 28 through a loop filter 40. Thus, it will be understood that a PLL (Phase locked loop) comprises voltage control oscillator 28, modulator 24, multiplier 22, first band pass filter 32, frequency multiplier 34, phase detector 36 and loop filter 40 connected with one another.

Output of the first band pass filter 32 diverges to be connected with input terminals of an envelope detector 42 while output terminals of detector 42 are connected with input terminals of a second band pass filter 44. A phase detector 46 accepts output from the second band pass filter 44 and one output from a changeover wave generator 48. Accordingly, one set of input terminals of detector 46 are connected with output terminals of the second band pass filter 44 while the other input terminals are connected with one set of output terminals from generator 48. The other output terminals of changeover wave generator 48 are connected with input terminals of antenna changeover device 12.

The one set of input terminals of stem orientation operator 50 are connected with output terminals of phase detector 46 and the other input terminals thereof are connected with the one set of output terminals of GPS receiver 52. The other output terminals of receiver 52 are connected with input terminals of PN code generator 30 and output terminals of stem orientation operation 50 are connected with input terminals of indicator 54.

In operation, output from each pole of antenna 10 is transmitted to antenna changeover device 12. Each pole of antenna 10 is selected by antenna changeover device 12 based on a signal which is transmitted from the output terminals of changeover wave generator 48. The pole selected receives GPS radio waves transmitted from a GPS satellite so that the GPS signals are introduced into the input terminals of frequency converter 14. Local oscillating signals generated in the first frequency synthesizer 16 by way of output of high stabilizing oscillator 18 are transmitted to the other input terminals of frequency converter 14. Thus, frequency converter 14 supplies frequency signals as output, which are based on the difference between the GPS signals and local oscillating signals, to intermediate frequency amplifier 20. Amplifier 20 amplifies output signals from frequency converter 14 which become one set of input signals of multiplier 22 while modulator 24 supplies signals as the other input signals to multiplier 22. Output signals of voltage control led oscillator 28 are modulated by modulator 24 in response to signals transmitted from delaying circuit 26, which are generated from Psuedo Noise signals (referred to as PN signals hereafter) in the PN code generator 30 and are delayed by ½ the bit period of the PN code. Furthermore, PN signals i.e. the output of PN code generator 30 are controlled to have a timing with a code of one of the GPS satellites which is selected by GPS receiver 52, positioned within an angle of elevation for proper measurement of orientation thereof. Output of multiplier 22 is transmitted to the first band pass filter 32 whose intermediate frequency is the one based on the difference between the intermediate frequency of intermediate frequency amplifier 20 and the frequency of voltage controlled oscillator 28 so that it can detect signals received by antenna 10 which are demodulated from spread spectrum. Output signals of the first band pass filter 32 are introduced into frequency multiplier 34 in which the signals are doubled and modulated components such as orbit data included in the GPS signals are eliminated. Then, the signals are introduced into one set of input terminals of phase detector 36.

As illustrated above, signals supplied from high stabilizing oscillator 18 are, on the one hand, introduced into the first frequency converter 16 while the signals are also introduced into the second frequency synthesizer 38. The output frequency of high stabilizing oscillator 18 is converted to a frequency which is the same frequency as the output of multiplier 34 in second frequency synthesizer 38 to be introduced into the other input terminals of phase detector 36. Output from phase detector 36 enters into the PLL including voltage controlled oscillator 28, modulator 24, multiplier 22, band pass filter 32 and frequency multiplier 34 through loop filter 40 so that the output signal frequency of frequency multiplier 34 becomes consistent with the output frequency of the second frequency synthesizer 38.

Figure 2:
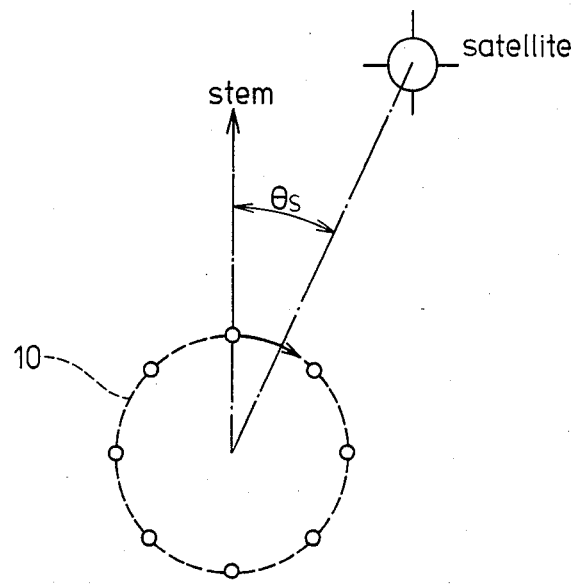
FIG. 2 is a schematic view illustrating the mutual relationship between a stem of ship and a satellite.
Figure 3:
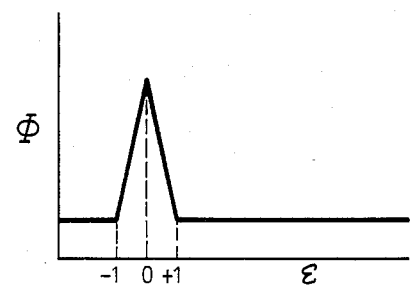
FIG. 3 is a schematic view illustrating the mutual relationship between an output of the first band-pass filter and a phase difference of the PN code.
Figure 4:
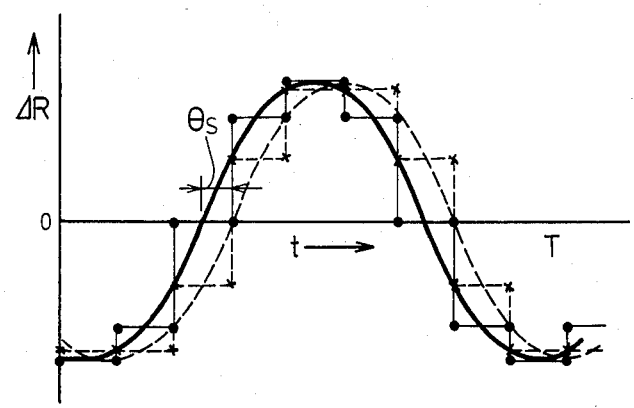
FIG. 4 is a schematic view illustrating the mutual relationship between a projection from an orientation of a GPS satellite to a ground plane and an orientation of a stem of ship.

A relative distance between GPS satellite and each pole of antenna 10 will be changed when a changeover period T of changeover wave generator 48 is properly selected and antenna changeover device 12 is controlled by changeover wave generator 48 to actuate the eight poles of antenna 10 to be rotated clockwise in order (as shown in FIG. 2). Thus, according to the above, the time for the PN code of GPS radio wave to reach the antenna 10 will be changed in order. This means that amplitude $\Phi$ of demodulated GPS signals appearing in the output of the first band pass filter 32 changes corresponding to a phase difference $\epsilon$ between the PN code included in the signals supplied from modulator 24 to multiplier 22 and the PN code included in the received signals of GPS satellite which are supplied from intermediate frequency amplifier 20 to the multiplier 22. That is, as shown in FIG. 3, the demodulated GPS signal has the largest amplitude when the phase difference $\epsilon$ becomes zero (0) whereas the demodulated GPS signal reduces its amplitude as the phase difference $\epsilon$ becomes adjacent to the end of one bit period of the PN code. The phase of the PN code generated by PN code generator 30 is controlled to be approximately consistent with the phase of PN code supplied from GPS receiver 52. However, the phase difference of PN codes between the two signals supplied to two input terminals of multiplier 22 is approximately ½ bit period with each other. Thus, output $\Phi$ of first band pass filter 32 becomes around $-\frac{1}{2}$ in FIG. 3. Accordingly, as each pole of antenna 10 is sequentially actuated by antenna changeover device 12 the relative distances between each pole and the GPS satellite is changed in order. Consequently, output fluctuation $\Delta R$ appears in the output of first band pass filter 32 as illustrated in FIG. 4. Output fluctuation $\Delta R$ will be changed in the form of steps comprising linked circlets (•) shown in FIG. 4 where the orientation of the stem is consistent with a projection from the orientation of GPS satellite to the ground plane whereas output fluctuation $\Delta R$ will be changed in the form steps comprising of linked crosses (x) shown therein where a projection from the orientation of the GPS satellite to the ground plane is deviated at $\Theta_s$ from the orientation of the stem. Thus, the output of second band pass filter 44 becomes sine curves of full line or dotted line as shown in FIG. 4 when a part of the output of the first band pass filter 32 is introduced into envelope detector 42 to extract output fluctuation $\Delta R$ which enters into the second band pass filter 44, whose center frequency is an inverse number of the changeover period of changeover wave generator 48. Consequently, the value being obtained by sabtracting (90°+360°/16) from the difference between the phase of changeover signal introduced into antenna changeover device 12 from changeover wave generator 48 and the phase of output of the second band pass filter 44 indicates the orientation from the stem orientation of a ship to a projection over the ground plane of GPS satellite orientation. Thus, the phase difference between the changeover signal and the output signal of the second band pass filter 44 will be obtained in the phase detector 46 and this phase difference is introduced into one set of input terminals of a bow orientation operator 50. The other input terminals thereof receive orientation signals regarding the GPS satellite whose P signal is being received, which are transmitted from GPS receiver 52 to PN code generator 30. Thus, in stem orientation operator 50, the stem orientation will be obtained by subtracting the value of the difference between the output of phase detector 46 and (90°+360°/16) from the GPS orientation signal and indicated by indicator 54.

Figure 5:
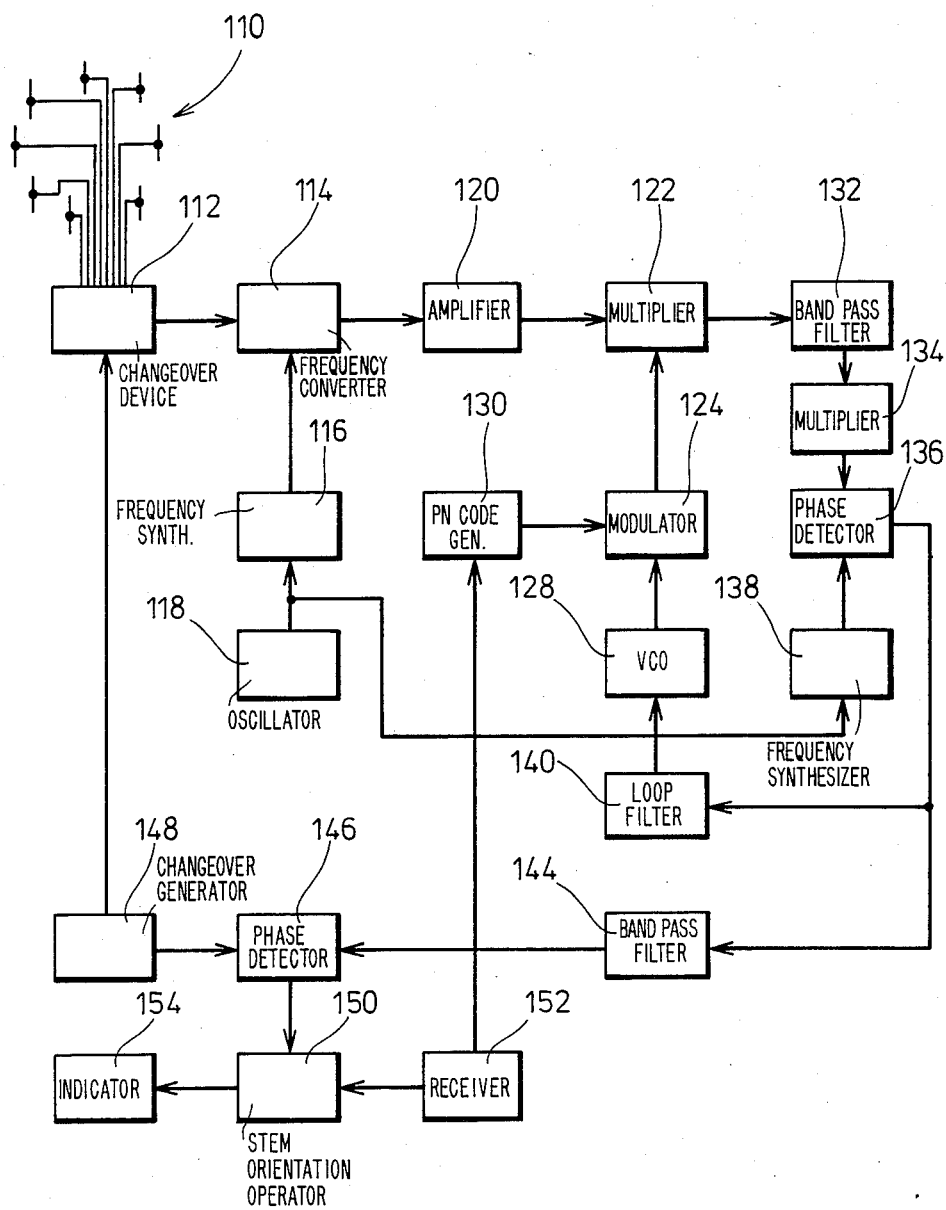
FIG. 5 is a block diagram illustrating another embodiment of a stem orientation measurement apparatus.
Figure 6:
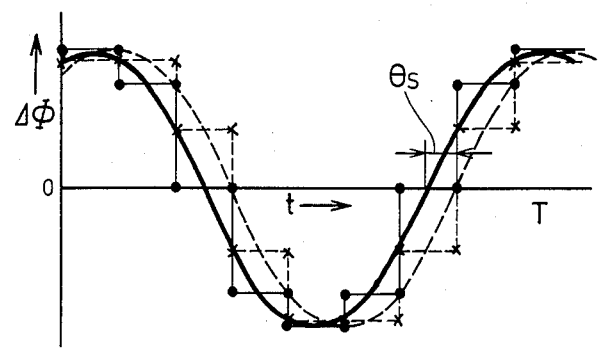
FIG. 6 is a schematic view illustrating the mutual relationship between a phase deviation of the received signal of a GPS radio wave and time.

Further, FIGS. 5 and 6 show another embodiment of a stem orientation measurement apparatus according to the present invention. In the embodiment, similar parts are numbered similar to those in FIGS. 1 to 4 but preceded by 100.

In the embodiment, delaying circuit 26 and envelope detector 42 included in the preceeding embodiment are eliminated as well as the output line diverging from the first band pass filter 32. That is, output terminals of a PN code generator 130 are directly connected with the one set of input terminals of modulator 124 and the output terminals of phase detector 136 are directly connected with the second band pass filter 144.

Different points of the present embodiment from the proceeding one in operation as follows.

Output of PN code generator 130 is directly transmitted into modulator 124 without passing through delaying circuit 26. Thus, output signals of modulator 124 comprise output of voltage controlled led oscillator 128 which is modulated by the PN code generator 130 directly.

Similar to the proceeding embodiment, a relative distance between GPS satellite and each pole of antenna 110 will be changed when the changeover period T of changeover wave generator 148 is properly selected and antenna changeover device 112 is controlled by changeover wave generator 148 to actuate eight (8) poles of antenna 110 to be rotated clockwise in order (as shown in FIG. 2). Thus, corresponding to the above, a phase deviation $\Delta \Phi$ will be changed in the form of steps comprising linked circles (•) shown in FIG. 6 where the orientation of the stem is consistent with a projection from the orientation of the GPS satellite to the ground plane whereas the phase deviation $\Delta \Phi$ will be changed in the form of steps comprising linked crosses (x) shown therein where a projection from the orientation of the GPS satellite to the ground plane deviates $\Theta_s$ from the orientation of the stem as shown in FIG. 2. Accordingly, a phase deviation produced by way of changing each pole of antenna 10 in order appears as a varied output of phase detector 136 where a changeover period T of changeover wave generator 148 is selected to be smaller than a time constant of loop filter 140. Thus, the output of the second band pass filter 144 becomes sine curves of full line or dotted line as shown in FIG. 6 when the output of phase detector 136 is introduced into the second band pass filter 144 where center frequency is an inverse number of the changeover period T. As a result of the above, the value obtained by adding (90°−360°/16) to the difference between the phase for changeover of changeover wave generator 148 and the phase of the output of the second band pass filter 144 indicates the orientation from the stem orientation of a ship to a projection over the ground plane of the GPS satellite orientation.

Thus, the phase difference between the output of changeover wave generator 148 and the output of the second band pass filter 144 will be obtained by phase detector 146 and this phase difference is introduced into set of one input terminals of a stem orientation operator 150. The other input terminals thereof receives orientation signals of the GPS satellite which include the PN code of GPS receiver 152. Consequently, in the stem orientation operator 150, the stem orientation will be obtained by subtracting the value (90°−360°/16) plus the output of phase detector 146 from the GPS orientation signal and indicated by indicator 154.

Figure 7:
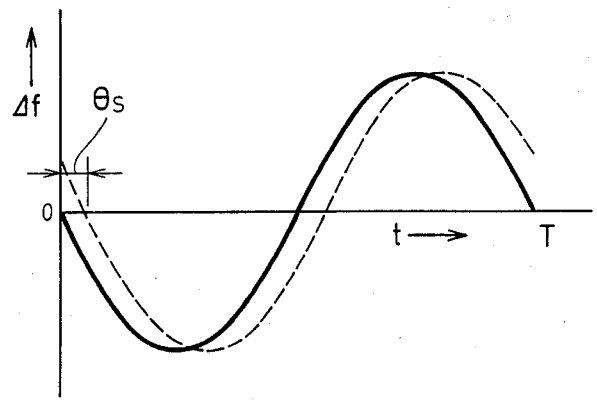
FIG. 7 is a schematic view illustrating the mutual relationship between time and a Doppler deviation appearing where one dipole antenna is used.

In a further embodiment, when rotating one dipole antenna on a circle at period T, which is adopted instead of antenna 110 and antenna changeover device 112, a Doppler deviation $\Delta f$ appears. Consequently, an output in the form of a sine curve corresponding to the Doppler deviation is obtained in the second band pass filter 144 as shown in FIG. 7. In FIG. 7, the full line indicates an output which is obtained where a projection over the ground plane from the orientation of GPS satellite is consistent with the stem orientation whereas the dotted line indicates an output which is obtained where a projection over the ground plane from the orientation of GPS satellite is deviated from the stem orientation at the phase difference $\Theta s$. In this case, in the stem orientation operator 150, a stem orientation will be obtained by subtracting the value 180° plus the output of phase detector 146 from the GPS orientation transmitted from GPS receiver 152 so as to indicate it on the indicator 154.

Figure 8:
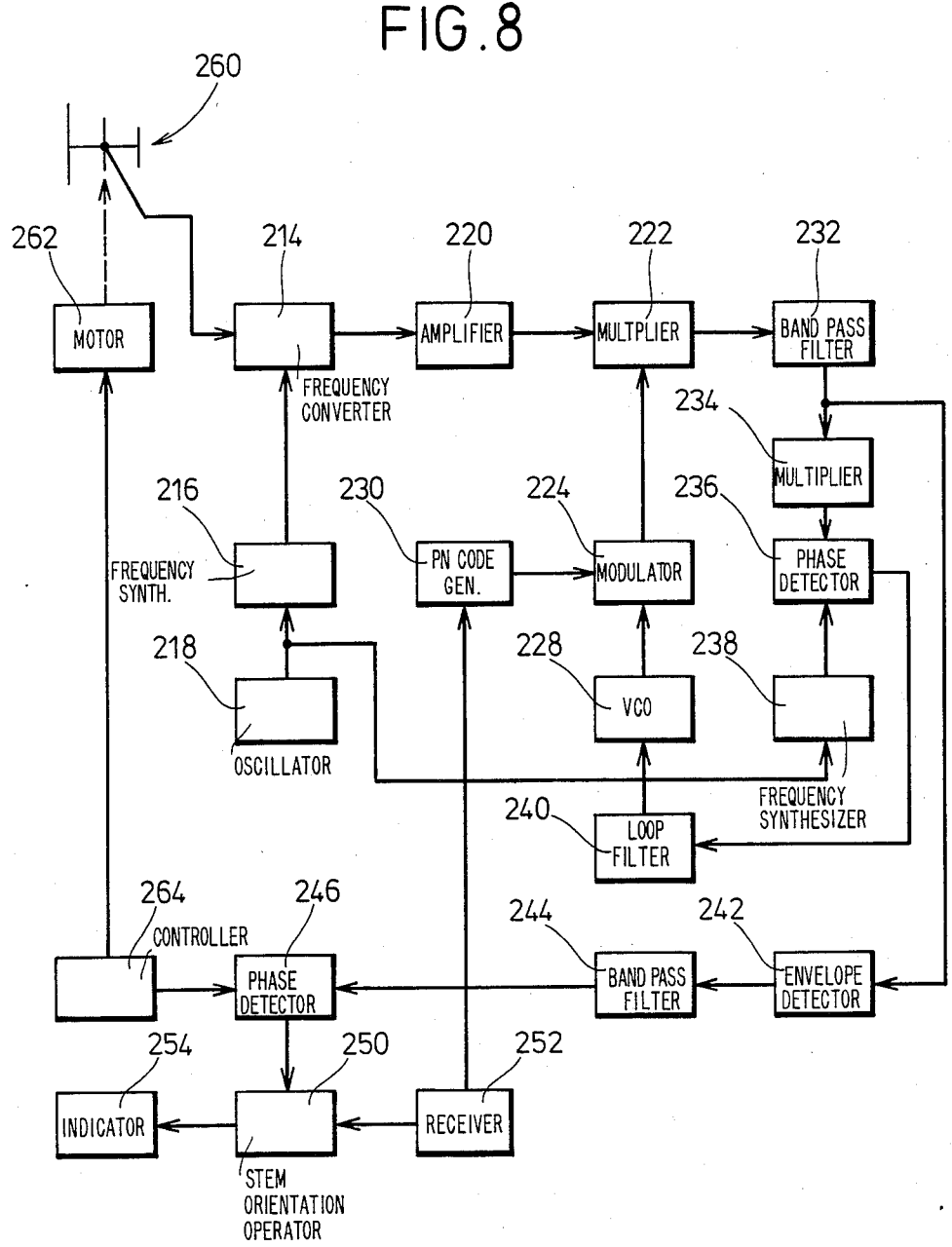
FIG. 8 is a block diagram of a further embodiment of a stem orientation measurement apparatus.
Figure 9:
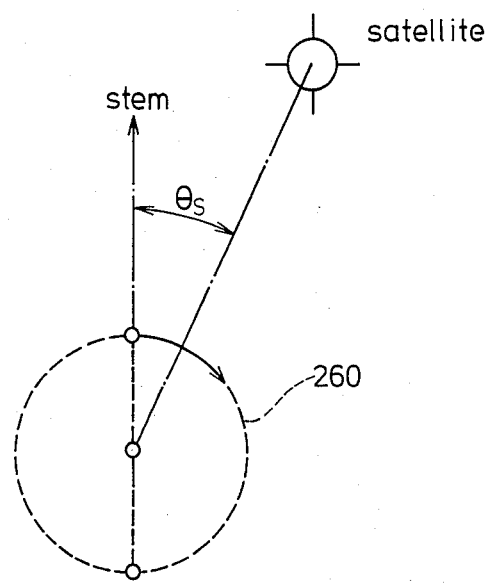
FIG. 9 is a schematic view illustrating the mutual relationship between a stem and satellite in a stem orientation measurement apparatus shown in FIG. 8.
Figure 10:
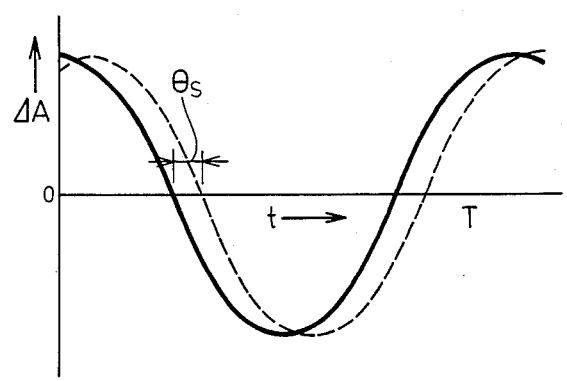
FIG. 10 is a schematic view illustrating the mutual relationship between an orientation of a stem and orientation of the projection from an orientation of a GPS satellite to a ground plane.

Still furthermore, FIGS. 8 through 10 show another embodiment of a stem orientation measurement apparatus according to the present invention. In this embodiment, similar parts are numbered similar to those in FIGS. 1 to 4 but preceeded by 200.

In the embodiment, delaying circuit 26 included in the first embodiment is eliminated and a directional antenna 260 is adopted instead of dipole antenna 10. Therefore, output terminals of PN code generator 230 are directly connected with the one set of input terminals of modulator 224. Directional antenna 260 is rotatably mounted on a motor 262. Motor 262 is connected with one set of output terminals in a rotary controller 264 and the other output terminals are connected with the one set of input terminals of phase detector 246.

In the operation of the stem orientation measurement apparatus regarding to this embodiment, rotation of motor 262 is controlled by signals supplied from the output terminals of rotary controller 264 and antenna 260 secured to a rotary axis (not shown) of motor 262 rotates as it does so as to receive GPS signals transmitted from the GPS satellite. GPS signals are introduced into the one set of input terminals of frequency converter 214 to perform the similar functions as illustrated in the first embodiment and after that the signals, as outputs of the second band pass filter 244, are introduced into the one set of input terminals of phase detector 246.

The received intensity of the GPS voltage will be changed in order when the period T for one rotation of the antenna 260 is properly selected and motor 262 is controlled by rotary controller 264 in order to rotate antenna 260 clockwise from the stem as shown in FIG. 9. This means that an amplitude of the demodulated GPS signal which appears in the output of the first band pass filter 232 includes a fluctuation $\Delta A$ as shown in FIG. 10. Thus, the output of the second band pass filter 244 becomes sine curves of full line or dotted line shown in FIG. 10 when a part of the output from the first band pass filter 232 is introduced into envelope detector 242 to extract the output amplitude fluctuation $\Delta A$ which enters into the second band pass filter 244, whose center frequency is an inverse number of the period T for one rotation of antenna 260.

In FIG. 10, the sine curve of full line indicates that a projection over the ground plane from the orientation of the GPS satellite is consistent with the stem orientation whereas the sine curve of dotted line indicates that a projection over the ground plane from the orientation of the GPS satellite deviates from the orientation of stem at $\Theta s$. Therefore, the value obtained by adding 90° to the difference between the phase of rotary controller 264 and the phase of the output of the second band pass filter 244 indicates the orientation from the stem orientation to a projection over the ground plane of the GPS satellite orientation. Thus, the phase difference between the phase output from the rotary controller to control rotation of the motor and the output of the second band pass filter 244 will be obtained in the phase detector 246 so as to be transmitted to stem orientation operator 250. In addition, the stem orientation operator 250 receives orientation signals concerning the GPS satellite, which are transmitted from GPS receiver 252 to PN code generator 230. Consequently, in the stem orientation operator 250, the bow orientation will be obtained by subtracting the value adding 90° to the output of phase detector 246 from the above orientation signal as indicated by the indicator 254.

According to the present invention, it becomes possible to measure the orientation of a stem without using a magnetic needle or gyroscope as a main part thereof. Thus, measurement for the orientation of the stem is performed stably and accurately even in the pole region and furthermore, the life of the apparatus is remarkably increased since the orientation of the stem is obtained electrically, not mechanically. Still furthermore, the cost for manufacturing thereof becomes remarkably reduced in comparison with the prior navigation system using inertia.

While the invention has been particularly shown and described with respect to preferred embodiments thereof, it will be understood by those in the art that various changes in form and detail may be made therein without departing from the spirit and scope of the invention.

What is claimed is:

1. A stem orientation measurement apparatus, comprising:
   an antenna receiving GPS radio waves,
   means for effectively rotating said antenna,
   a GPS receiver for providing information about a location of a ship and an orientation of a GPS satellite, means for determining the fluctuation of received radio waves from said GPS satellite based on a PN code of said GPS satellite transmitted from said GPS receiver, the timing of said PN code and GPS signals received by said antenna, means for detecting said orientation of said GPS satellite relative to the orientation of the stem by detecting a phase difference between a period of fluctuation of said received wave and a period of rotation of said antenna, means for determining said orientation of the stem relative to a reference direction from said orientation of said GPS satellite, and an indicator for indicating said orientation of the stem.

2. An apparatus as set forth in claim 1, wherein said antenna comprises a plurality of omnidirectional antennas which are disposed on a circle and are sequentially activated for a given period.

3. An apparatus as set forth in claim 1, wherein said antenna comprises at least one directional antenna which effectively rotates.

4. An apparatus as set forth in claim 2, wherein said antenna comprises at least four (4) dipole antennas.

5. An apparatus as set forth in claim 1, wherein said means for determining the fluctuation of received radio waves from said GPS satellite determines the distance from said GPS satellite to said antenna.

6. An apparatus as set forth in claim 1, wherein said means for determining the fluctuation of received radio waves from said GPS satellite determines the Doppler fluctuation of said received radio waves from said GPS satellite.

7. An apparatus as set forth in claim 1, wherein said means for determining the fluctuation of received radio waves from said GPS satellite determines phase fluctuation of said received radio waves from said GPS satellite.

8. An apparatus as set forth in claim 1, wherein said means for determining the fluctuation of received radio waves from said GPS satellite determines the amplitude fluctuation of said received radio waves from said GPS satellite.

* * * * *